United States Patent [19]
Nguyen

[11] Patent Number: 5,394,174
[45] Date of Patent: Feb. 28, 1995

[54] ACTUATOR MECHANISM FOR A PENCIL CARRIAGE

[75] Inventor: Patrick Nguyen, Walnut, Calif.

[73] Assignee: CalComp Inc., Anaheim, Calif.

[21] Appl. No.: 835,509

[22] Filed: Feb. 14, 1992

[51] Int. Cl.⁶ ............................................. G01D 15/24
[52] U.S. Cl. .................................. 346/139 R; 33/18.1
[58] Field of Search ............... 346/139 R, 139 C, 49, 346/29; 33/18.1, 18.2; 401/53, 65, 67

[56] References Cited

U.S. PATENT DOCUMENTS

| | | | |
|---|---|---|---|
| 4,452,544 | 6/1984 | Sumita | 401/53 |
| 4,617,739 | 10/1986 | Kubo | 33/18.1 |
| 4,905,016 | 2/1990 | Kobayashi et al. | 346/139 R X |
| 4,991,300 | 2/1991 | Takahashi | 33/18.2 |
| 5,179,393 | 1/1993 | Takahashi | 346/139 R |

OTHER PUBLICATIONS

Schwarz et al., "Pictorial Handbook of Technical Devices", Chem. Pub. Co. 1971 pp. 66–67.

*Primary Examiner*—Benjamin H. Fuller
*Assistant Examiner*—Alrick Bobb
*Attorney, Agent, or Firm*—Frederic P. Smith; William F. Porter, Jr.

[57] ABSTRACT

An actuator mechanism for a pencil carriage in which a motor is coupled to a lead holder to move the lead holder relative to a drawing media surface, a pusher mechanism moves a lead carried by an internal of the lead holder relative to the position of the lead holder and the drawing media surface independently of the movement of the lead holder and a plotter control and sensors coupled thereto are provided for synchronizing the operation of the motor and the pusher mechanism to control the position of the lead relative to the lead holder and the drawing media surface. In a particular embodiment, the pusher mechanism includes a pusher rod for engaging the lead, a movable rack and a pinion gear engaged therewith, the movable rack being coupled to the pusher rod to move the lead, and a motor for driving the pinion gear.

16 Claims, 2 Drawing Sheets

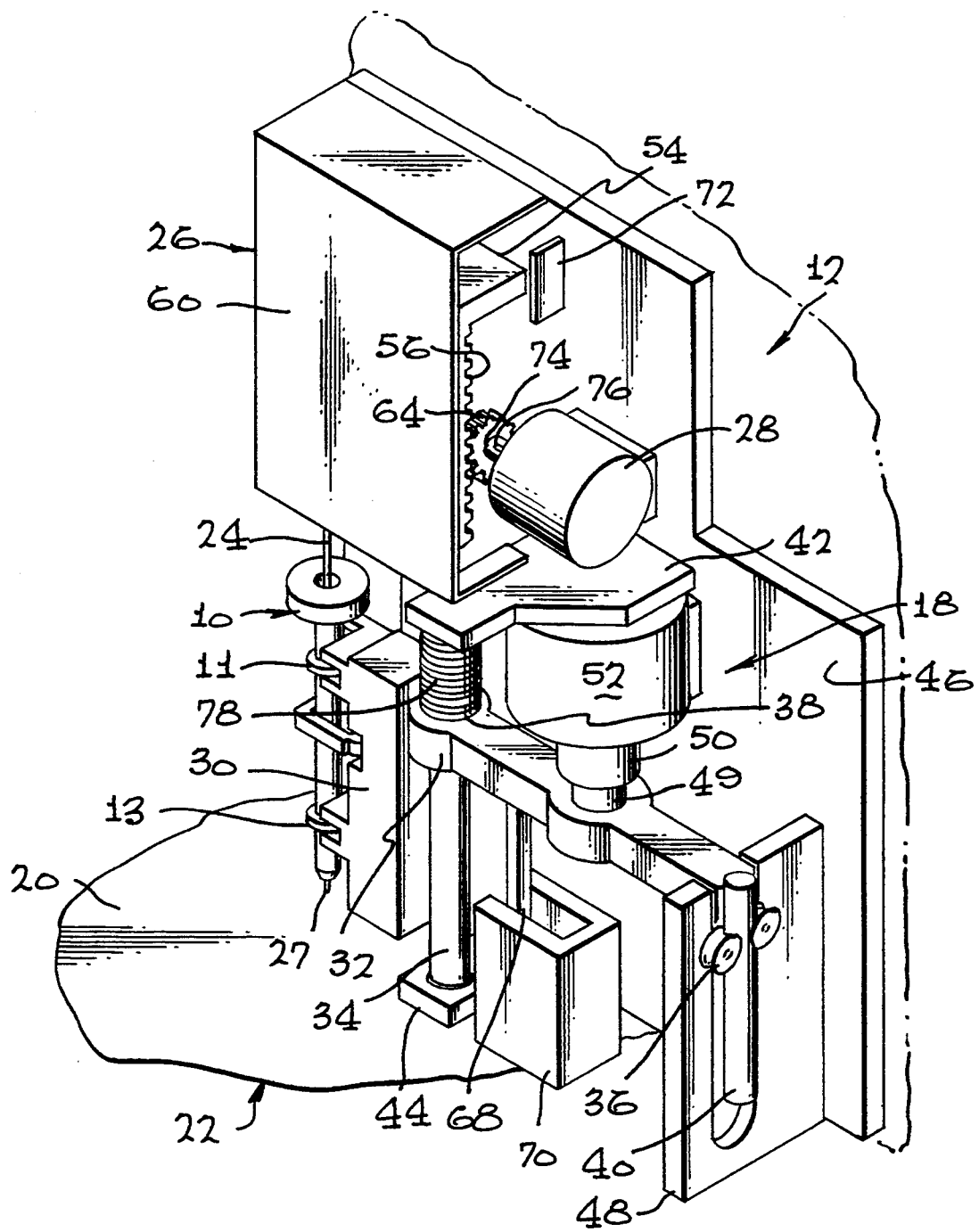

ACTUATOR MECHANISM FOR A PENCIL CARRIAGE

BACKGROUND OF THE INVENTION

1. Field of the Invention

This invention relates to the field of pencil plotters and, in particular, to an actuator mechanism for a pencil carriage in which the position of a lead holder and the lead therein are controlled both relative to one another and relative to a drawing media surface.

2. Description of Related Art

Pencil plotters are being used more increasingly in the making of graphics and drawings due to the ability of such graphics and drawings to be erased or to have alterations or corrections made thereto. In addition, the use of lead, rather than ink, in the plotters eliminates certain detrimental factors such as ink clogging up in the pen during the plotting process or drying up in the pen tip while the pen is held in a carousel waiting to be used. Nevertheless, certain precautions have to be taken in the use of pencil plotters to ensure an even and unwavering line or trace on the surface of the drawing media. These precautions entail, among other things, making sure that the lead holder is properly secured in a lead holder mechanism and that the lead itself is properly secured within the lead holder. Mechanisms for accomplishing the above are described in my copending patent applications, Ser. No. 07/834,967, filed Feb. 14, 1992, entitled "Finger Mechanism for a Lead Holder" now abandoned and Ser. No. 07/834,966, filed Feb. 14, 1992, entitled "Lead Holder Mechanism for a Pencil Plotter", assigned to the same assignee as the present invention. Another problem inherent in pencil plotters is ensuring that the lead carried by the lead holder is always in even contact with the surface of the drawing media.

Thus, it is a primary object of the present invention to provide an improved actuator mechanism for the pencil carriage of a pencil plotter.

It is another object of the present invention to provide an improved actuator mechanism in which an even and constant down force is applied to the lead.

It is a further object of the present invention to provide an improved actuator mechanism which is stable during the up/down cycle of the lead holder.

It is still another object of the present invention to provide an improved actuator mechanism which accurately controls the position of the lead and lead holder relative to one another and the surface of the drawing media during the plotting cycle.

SUMMARY OF THE INVENTION

An actuator mechanism for a pencil carriage is provided in which a lead holder is moved relative to a drawing media surface, a lead carried by and internal of the lead holder is moved relative to the position of the lead holder and the drawing media surface, and means is provided for synchronizing the movement of the lead holder and the lead to control the position of the lead relative to the lead holder and the drawing media surface. In a particular embodiment, a pusher mechanism engages the lead and is driven by a movable rack and a pinion gear engaged therewith to move the lead relative to the position of the lead holder.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is an isometric view of the actuator mechanism of the present invention.

DESCRIPTION OF THE PREFERRED EMBODIMENT

Figure 1:
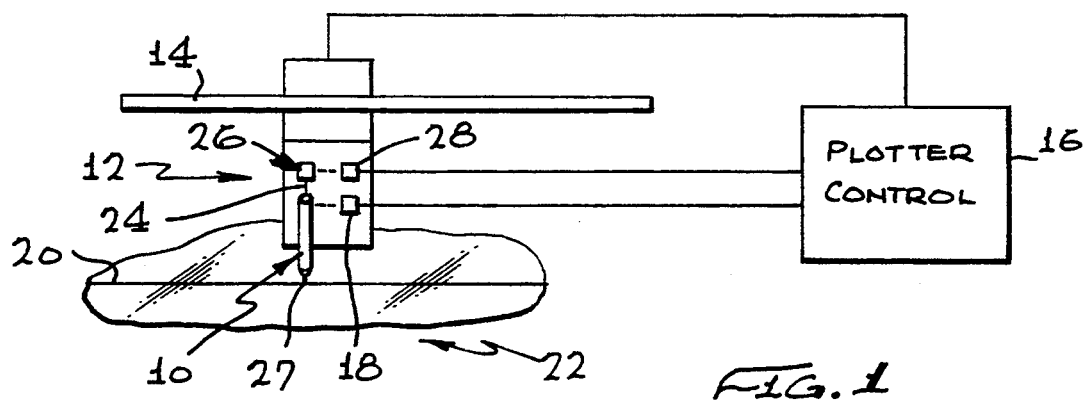
FIG. 1 is a simplified view of a typical pencil plotter moving mechanism coupled to electronics suitable for the operation of the present invention.

Referring now to FIG. 1, a lead holder 10 is shown coupled to a pencil carriage 12. The pencil carriage 12 rides on a beam 14, and the pencil carriage 12 and the beam 14 comprise a linear motor system and are activated by plotter control 16. Lead holder 10 is coupled to a lead holder actuator mechanism 18 which causes the lead holder 10 to move toward and away from the surface 20 of a drawing media 22 when activated by plotter control 16. The lead holder 10 is positioned to receive a pusher rod 24 from a rod pusher mechanism 26 which drives a lead 27 toward the surface 20 of the drawing media 22. The rod pusher mechanism 26 is driven toward and away from the surface 20 by a DC motor 28 which is activated by the plotter control 16. As will be described in more detail hereinafter, plotter control 16 also receives sensor position information from and about the positions of the lead holder actuator mechanism 18, the rod pusher mechanism 26 and the motor 28 and coordinates the movements of the rod pusher mechanism 26 and the lead holder actuator mechanism 18.

As is shown in FIG. 2, a lead holder 10 having index bushings 11,13 is supported by a finger mechanism 30 of the type described in my above-recited copending patent application. The finger mechanism 30 is coupled to an actuator arm 32 which rides on shaft 34 at one end and guide bearings 36 at the other end. The actuator arm 32 has a bushing 38 which rides on the shaft 34 and a depending portion 40 which rides between the guide bearings 36. The shaft 34 is supported by arms 42,44 which are coupled to backplate 46 which in turn is coupled to plotter carriage 12 shown in FIG. 1. Supporting plate 48 which carries guide bearings 36 is also coupled to backplate 46. Actuator arm 32 is coupled to red 49 which in turn is coupled to the rotor portion 80 of a linear motor 52 supported by backplate 46. Upon activation, the linear motor 52 thus drives the actuator arm 32, the finger mechanism 30 and the lead holder 10 toward the surface 20 of the drawing media 22.

Figure 3:
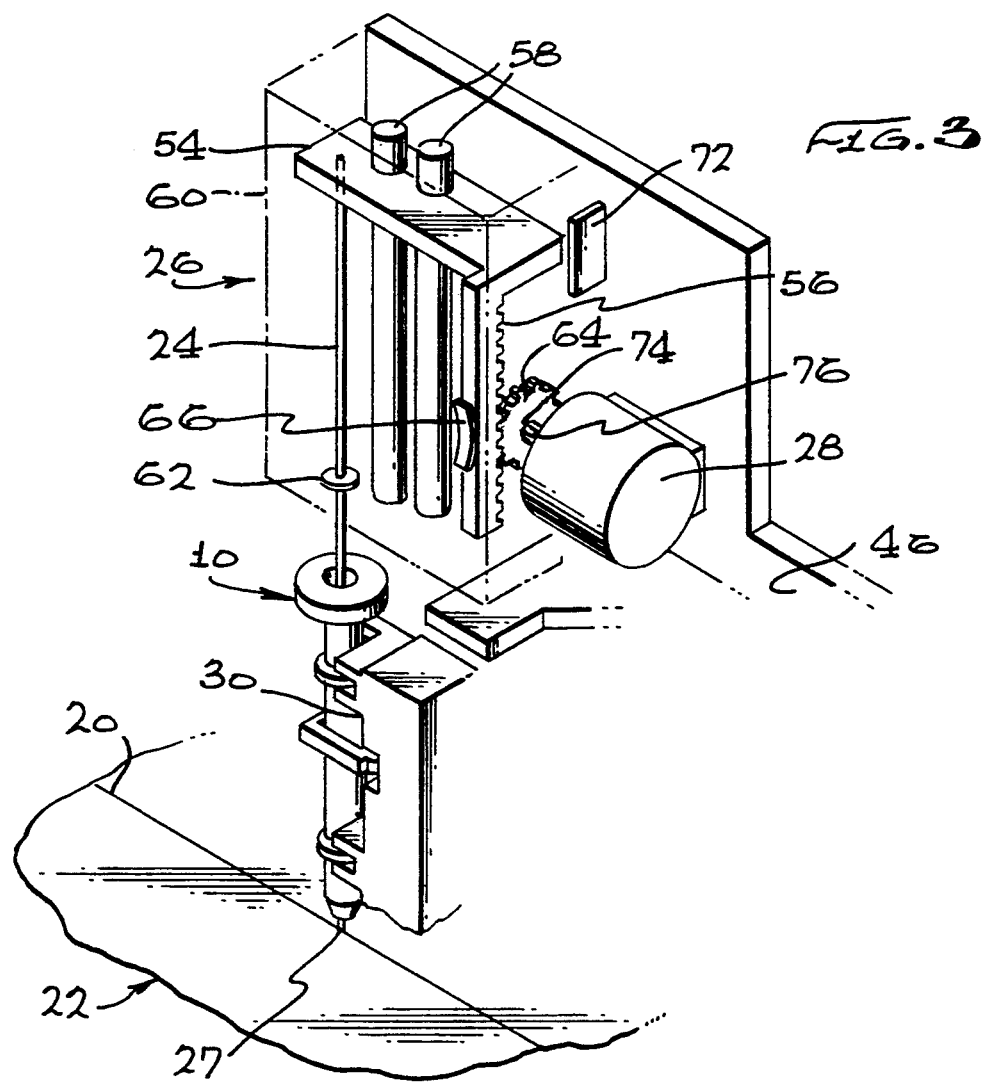
FIG. 3 illustrates in greater detail the rod pusher mechanism of the present invention.

As stated previously, the lead holder 10 is positioned, by finger mechanism 30, to receive a pusher rod 24 from a rod pusher mechanism 26 which drives lead 27 toward the surface 20 of the drawing media 22. As is illustrated in greater detail in FIG. 3, the pusher rod 24 is coupled to a support bar 54 which carries a rack 56 on the opposite end thereof. The bar 54 rides on rods 58 which are coupled to and supported by frame 60. Frame 60 has a bushing 62 therethrough which acts as a guide for pusher rod 24. The teeth of the rack 56 mesh with pinion gear 64 driven by motor 28 supported by backplate 46 coupled to the plotter carriage 12. The rod pusher mechanism 26 also includes a leaf spring 66 coupled to the frame 60 opposite the pinion gear 64 which preloads the rack 56 to the pinion gear 64. Upon activation, the motor 28 thus drives the rack 56, the support bar 54 and the pusher rod 24 downward and causes the lead 27 to be pushed through the lead holder 10 toward the surface 20 of the drawing media 22.

In the operation of the invention, the linear motor 52 initially is activated by plotter control 16 and drives the lead holder 10 down until the lead holder 10 touches the surface 20 of the drawing media 22. This position of linear motor 52 and the initial up position of the linear motor 52 are sensed by the position of rod 68 in sensor element 70 and electrically relayed to and recorded by the plotter control 16. At the same time, the motor 28 is activated by plotter control 16 and drives the pusher rod 24 down until the lead 27 touches the surface 20 of the drawing media 22. The positions of the support bar 54 before and after the motor 28 drives it down are sensed by position sensor 72 and electrically relayed to and recorded by the plotter control 16. The position of the shaft 74 of the motor 28 is sensed by a shaft encoder 76 electrically coupled to the shaft 74 and also electrically relayed to and recorded by the plotter control 16. After these initial conditions have been ascertained, the current to the linear motor 52 is discontinued by plotter control 16 and restoring spring 78 coupled to shaft 34 returns the actuator arm 32 and the lead holder 10 to the up position. At the same time, plotter control 16 applies a current to motor 28 to drive the rack 56 upwards until the support bar 54 reaches its up position as previously indicated by the position sensor 72, thus also bringing pusher rod 24 up so that the lead 27 is not driven through the lead holder 10 by the upward movement of lead holder 10.

Upon the outset of plotting, plotter control 16 activates the pencil carriage 12 along the beam 14 and also causes the drawing media 22 to move under the pencil carriage 12. At the same time, the plotter control 16 sends initial signals to linear motor 52 and motor 28 causing the lead holder 10 to descend to the surface 20 of the drawing media 22 and the pusher rod 24 to descend with the lead holder 10 to thus continue to apply pressure to the lead 27 to ensure that the lead 27 contacts the surface 20 and plots a trace thereon. Thereafter, the plotter control 16 sends a predetermined current to the motor 28 to cause it to apply a constant pressure to the pusher rod 24 and the lead 27 so that an even and constant trace is applied to the surface 20 by the lead 27 as the lead 27 wears down. Such an even and constant trace is ensured due to the rigidity and stability of the rack and pinion drive and the preload of the leaf spring. At the end of each vector in a vector plotter, or at the end of a plot in a non-vector plotter, plotter control 16 discontinues the signal to the linear motor 52, allowing the spring 78 to return the lead holder 10 to its initial position and simultaneously applies a signal to the motor 28 causing it to drive the rack 56 upwards a distance equal to the distance previously indicated by the position sensor 72 less an amount caused by wear of the lead 27 as indicated by the rotation of the shaft 74 measured by the shaft encoder 76, such rotation being translated into a linear measurement by the plotter control 16. Such a distance is also very accurately controlled due to the rigidity and stability of the rack and pinion drive and the preload of the leaf spring.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

I claim:

1. Actuator mechanism for a pencil carriage comprising:

a lead holder;

first means coupled to said lead holder for moving said lead holder toward and away from a drawing media surface, whereby said lead holder is able to assume one or more selected positions relative to said drawing media surface;

second means for moving a lead carried by and internal of said lead holder toward said drawing media surface during a plotting cycle independently of the movement of said lead holder, whereby said lead is able to assume one or more selected positions relative to said drawing media surface and said positions of said lead holder; and synchronizing means coupled to said first and said second means for synchronizing said first and said second means during said plotting cycle to control during said plotting cycle said positions of said lead relative to said positions of said lead holder and said drawing media surface.

2. The actuator mechanism of claim 1 wherein said second means includes a pusher mechanism engaging said lead, a movable rack and a pinion gear engaged therewith, said movable rack being coupled to said pusher mechanism to move said lead, and driving means for driving said pinion gear.

3. The actuator mechanism of claim 2 further including spring means for urging said movable rack into intimate engagement with said pinion gear to provide increased stability to said pusher mechanism.

4. The actuator mechanism of claim 2 wherein said driving means includes a motor to provide a force on said lead.

5. The actuator mechanism of claim 1 wherein said first means includes support means for supporting said lead holder and a linear motor coupled to said support means to position said support means relative to said drawing media surface.

6. The actuator mechanism of claim 1 wherein said synchronizing means includes sensor means for sensing said positions of said lead holder and said means for moving said lead.

7. The actuator mechanism of claim 1 wherein said second means includes means for measuring wear on said lead as said lead plots on said drawing media surface.

8. The actuator mechanism of claim 1 wherein said synchronizing means controls the operation of said second means to apply a constant pressure on said lead toward said drawing media surface.

9. Actuator mechanism for a pencil carriage comprising:

a lead holder;

first means coupled to said lead holder for moving said lead holder toward and away from a drawing media surface, whereby said lead holder is able to assume one or more selected positions relative to said drawing media surface;

second means for moving a lead carried by and internal of said lead holder toward said drawing media surface, whereby said lead is able to assume one or more selected positions relative to said drawing media surface and said positions of said lead holder, said second means including a pusher mechanism engaging said lead, a movable rack and a pinion gear engaged therewith, said movable rack being coupled to said pusher mechanism to move said lead, and driving means for driving said pinion gear; and synchronizing means for synchronizing said and first and second means to control said positions of said lead relative to said positions of said lead holder and said drawing media surface.

10. The actuator mechanism of claim 9 further including spring means for urging said movable rack into intimate engagement with said pinion gear to provide increased stability to said pusher mechanism.

11. The actuator mechanism of claim 9 wherein said driving means includes a motor to provide a force on said lead.

12. The actuator mechanism of claim 9 wherein said synchronizing means controls the operation of said second means to apply a constant pressure on said lead toward said drawing media surface.

13. A pusher mechanism for lead in a lead holder in a pencil carriage comprising:

a pusher rod engaging said lead;

a movable rack and a pinion gear engaged therewith, said movable rack being coupled to said pusher rod to push said lead toward a drawing media surface;

spring means for urging said movable rack into intimate engagement with said pinion gear to provide increased stability to said pusher mechanism; and driving means for driving said pinion gear.

14. Actuator mechanism for a pencil carriage having a lead holder having lead therein comprising:

a pusher rod engaging said lead;

a movable rack and a pinion gear engaged therewith, said movable rack being coupled to said pusher rod to push said lead toward a drawing media surface;

driving means for driving said pinion gear, said driving means including measuring means for measuring wear on said lead as said lead plots on said drawing media surface; and means responsive to said measuring means and coupled to said driving means for controlling the position of said movable rack.

15. A pusher mechanism for lead in a lead holder in a pencil carriage comprising:

a pusher rod engaging said lead;

a movable rack and a pinion gear engaged therewith, said movable rack being coupled to said pusher rod to push said lead toward a drawing media surface;

sensor means for sensing a position of said movable rack relative to said drawing media surface; and driving means for driving said pinion gear.

16. Actuator mechanism for a pencil carriage having a lead holder having lead therein comprising:

a pusher rod engaging said lead;

a movable rack and a pinion gear engaged therewith, said movable rack being coupled to said pusher rod to push said lead toward a drawing media surface;

driving means for driving said pinion gear; and means for causing said driving means to provide a constant down force on said lead toward said drawing media surface.

* * * * *